(12) United States Patent
Hebert et al.

(10) Patent No.: US 12,460,759 B2
(45) Date of Patent: Nov. 4, 2025

(54) ASEPTIC COUPLING SYSTEM WITH SEAL ISOLATING CONNECTORS

(71) Applicant: Nordson Corporation, Westlake, OH (US)

(72) Inventors: Casey Tyler Hebert, Fort Collins, CO (US); Jack Wise, Erie, CO (US); Frank Lombardi, Longmont, CO (US)

(73) Assignee: Nordson Corporation, Westlake, OH (US)

( * ) Notice: Subject to any disclaimer, the term of this patent is extended or adjusted under 35 U.S.C. 154(b) by 30 days.

(21) Appl. No.: 18/698,392

(22) PCT Filed: Oct. 5, 2022

(86) PCT No.: PCT/US2022/045742
§ 371 (c)(1),
(2) Date: Apr. 4, 2024

(87) PCT Pub. No.: WO2023/059691
PCT Pub. Date: Apr. 13, 2023

(65) Prior Publication Data
US 2024/0401734 A1    Dec. 5, 2024

Related U.S. Application Data

(60) Provisional application No. 63/252,914, filed on Oct. 6, 2021.

(51) Int. Cl.
*F16L 37/34*   (2006.01)
*A61M 39/18*   (2006.01)
(Continued)

(52) U.S. Cl.
CPC ............ *F16L 37/34* (2013.01); *A61M 39/18* (2013.01); *A61M 39/26* (2013.01); *F16L 37/35* (2013.01); *F16L 2201/44* (2013.01)

(58) Field of Classification Search
CPC .................. A61M 39/18; A61M 39/26; A61M 2039/2486; F16L 2201/44; F16L 37/32; F16L 37/34; F16L 37/35; F16L 37/0841
See application file for complete search history.

(56) References Cited

U.S. PATENT DOCUMENTS 2,457,251 A * 12/1948 Main, Jr. .................. F16L 37/34
                                                                137/614.04
3,039,794 A *  6/1962 De Cenzo ............... F16L 37/34
                                                                285/317
(Continued)

FOREIGN PATENT DOCUMENTS

WO    WO-2006043883 A1 *  4/2006  .............. F16L 37/32

OTHER PUBLICATIONS

International Search Report and Written Opinion from PCT/US2022/045742 dated Jan. 9, 2023.

*Primary Examiner* — David Colon-Morales
(74) *Attorney, Agent, or Firm* — Calfee, Halter & Griswold LLP

(57) ABSTRACT

An aseptic coupling system includes a first and second connectors having inboard mating portions, outboard terminal connections, first and second valve seals, and first and second valve elements. When the first and second connectors are joined in a coupled condition, the first and second valve elements are each moved from a shutoff position in sealing engagement with the first and second valve seals to a flow position separated from the first and second valve seals to permit flow therebetween, thereby defining a flow path between the outboard terminal connections. In the coupled condition, non-wetted surfaces of the first valve seal are sealed off from the flow path by sealing engagement with a flow passage defining annular wall of the second connector, and non-wetted surfaces of the second valve seal are (Continued)

sealed off from the flow path by scaling engagement with a flow passage defining annular wall of the first connector.

20 Claims, 12 Drawing Sheets

(51) Int. Cl.
*A61M 39/26* (2006.01)
*F16L 37/35* (2006.01)

(56) References Cited

U.S. PATENT DOCUMENTS

| | | | | |
|---|---|---|---|---|
| 3,120,968 | A * | 2/1964 | Calvin | F16L 37/34 285/321 |
| 3,417,781 | A * | 12/1968 | Gregg | F16L 37/34 137/614.04 |
| 3,613,726 | A * | 10/1971 | Torres | F16L 37/23 285/86 |
| 4,219,048 | A * | 8/1980 | Ekman | F16L 37/34 137/614.04 |
| 4,949,745 | A * | 8/1990 | Mckeon | F16L 37/23 137/15.09 |
| 5,211,197 | A | 5/1993 | Marrison et al. | |
| 5,316,041 | A * | 5/1994 | Ramacier, Jr. | F16L 37/32 285/317 |
| 6,161,578 | A * | 12/2000 | Braun | F16L 37/35 137/614.04 |
| 7,153,296 | B2 * | 12/2006 | Mitchell | A61M 39/26 604/905 |
| 7,469,472 | B2 * | 12/2008 | deCler | F16L 37/34 285/285.1 |
| 7,631,660 | B2 * | 12/2009 | deCler | F16L 37/098 137/614.05 |
| 8,152,203 | B2 * | 4/2012 | Olivier | F16L 37/36 604/905 |
| 8,671,964 | B2 * | 3/2014 | Py | F16L 41/02 137/614.04 |
| 9,933,094 | B2 * | 4/2018 | Fangrow | F16L 29/00 |
| 10,094,502 | B2 * | 10/2018 | Tiberghien | F16L 37/34 |
| 10,808,873 | B2 * | 10/2020 | Tiberghien | F16L 37/138 |
| 10,975,982 | B2 * | 4/2021 | Wilhelm | F16D 39/00 |
| 11,040,868 | B2 * | 6/2021 | Peattie | B67D 7/44 |
| 11,060,650 | B2 * | 7/2021 | Vranish | F16L 37/086 |
| 11,326,727 | B2 * | 5/2022 | Sung | F16L 37/0841 |
| 11,480,280 | B2 * | 10/2022 | Langer | F16L 37/0841 |
| 11,480,281 | B2 * | 10/2022 | Benson | A61M 39/1011 |
| 11,566,736 | B2 * | 1/2023 | Truong | A61M 39/10 |
| 11,614,192 | B2 * | 3/2023 | Benson | F16L 37/30 251/148 |
| 11,619,334 | B2 * | 4/2023 | Langer | F16L 37/0841 285/66 |
| 11,635,162 | B2 * | 4/2023 | Martin | F16L 37/0841 285/317 |
| 12,038,113 | B2 * | 7/2024 | Truong | F16L 37/34 |
| 12,203,579 | B2 * | 1/2025 | Langer | F16L 37/0841 |
| 2008/0290657 | A1 * | 11/2008 | McKeon, III | A61M 39/18 285/80 |
| 2010/0025989 | A1 | 2/2010 | McKeon, III | |
| 2015/0258324 | A1 * | 9/2015 | Chida | A61M 39/10 604/538 |
| 2022/0227347 | A1 * | 7/2022 | Galant | B62L 3/023 |

* cited by examiner

ASEPTIC COUPLING SYSTEM WITH SEAL ISOLATING CONNECTORS

CROSS-REFERENCE TO RELATED APPLICATION

This application is the U.S. national stage entry of International Application No. PCT/US2021/045742, filed Oct. 5, 2022 and entitled ASEPTIC COUPLING SYSTEM WITH SEAL ISOLATING CONNECTORS, which claims priority to and all benefit of U.S. Provisional Patent Application Ser. No. 63/252,914, filed Oct. 6, 2021 and entitled ASEPTIC COUPLING SYSTEM WITH SEAL ISOLATING CONNECTORS, the entire disclosure disclosures of which is are incorporated herein by reference.

BACKGROUND

Pharmaceutical, biotechnology, and chemical industries often rely on processing systems that can transfer fluids in a pure or sterile manner. As such, these industries rely on aseptic connectors to prevent unwanted organisms or media from contaminating the system.

Current aseptic coupling arrangements on the market require multiple steps to connect and disconnect, have a large footprint, require metal or mechanisms in the fluid path that can damage/contaminate cells or media, provide for only single use connection, and/or have mechanisms which lend itself to contamination concerns.

SUMMARY OF THE DISCLOSURE

In accordance with an embodiment of one or more of the inventions presented in this disclosure, an aseptic coupling system includes first and second connectors. The first connector includes a first body and a first valve element. The first body includes an inboard mating portion, an outboard terminal connection, and a flow element disposed in an internal cavity of the first body, with the flow element defining a first flow passage. A first valve seal is disposed at an inboard end of the flow element, with at least one flow aperture intersecting the first flow passage outboard of the first valve seal. The first valve element is disposed in the internal cavity between the flow element and an inner surface of the first body and is movable between a shutoff position in sealing engagement with the first valve seal and a flow position permitting flow between the inboard mating portion and the first flow passage. The second connector includes a second body, a second valve element, and a plunger element. The second body includes an inboard mating portion for mating engagement with the inboard mating portion of the first connector, an outboard terminal connection, and a second valve seal disposed at an inboard end of the mating portion. The second valve element is disposed in an internal cavity of the second body and is movable between a shutoff position in sealing engagement with the second valve seal and a flow position permitting flow between the inboard mating portion and a second flow passage within the second connector. The plunger element is disposed in a passage of the second valve element and includes an inboard plunger seal. The plunger element is axially biased toward the second valve seal for sealing engagement between the plunger seal and the second valve seal.

In accordance with another embodiment of one or more of the inventions presented in this disclosure, an aseptic connector includes a connector body and an annular valve element. The connector body includes an inboard mating portion, an outboard terminal connection, and a central flow element disposed in an internal cavity of the body. The central flow element defines a central flow passage, a valve seal disposed at an inboard end of the central flow element, and at least one peripheral flow aperture intersecting the central flow passage outboard of the valve seal. The annular valve element is disposed in the internal cavity between the central flow element and an inner surface of the body, with the valve element being axially biased into sealing engagement with the valve seal. The annular valve element is axially movable along the central flow element to a flow position disengaged from the valve seal to permit fluid flow between the central flow passage and the inboard mating portion of the connector body through the at least one peripheral flow aperture.

In accordance with another embodiment of one or more of the inventions presented in this disclosure, an aseptic connector includes a connector body, a valve element, and a plunger element. The connector body includes an inboard mating portion, an outboard terminal connection and an annular valve seal disposed at an inboard end of the mating portion. The valve element is disposed in an internal cavity of the connector body and is biased from a flow position axially spaced from the annular valve seal to a shutoff position in sealing engagement with the annular valve seal. The plunger element is disposed in a passage of the valve element and includes an inboard plunger seal. The plunger element is axially biased toward the annular valve seal for sealing engagement between the plunger seal and the annular valve seal. The plunger element is axially moveable within the passage of the valve element to disengage from the annular valve seal, to permit fluid flow through the annular valve seal and through an outer peripheral flow passage between the valve element and the connector body when the valve element is in the flow position.

In accordance with another embodiment of one or more of the inventions presented in this disclosure, an aseptic coupling system includes a first connector having an inboard mating portion, an outboard terminal connection, a first valve seal, and a first valve element, and a second connector having an inboard mating portion for mating engagement with the inboard mating portion of the first connector, an outboard terminal connection, and a second valve seal. When the first and second connectors are in an uncoupled condition, first and second non-wetted surface portions of the corresponding first and second connectors are exposed to an external environment, and first and second wetted surfaces of the corresponding first and second valve seals are sealed off from exposure to the external environment. When the first and second connectors are joined in a coupled condition, the first and second valve elements are each moved from a shutoff position in sealing engagement with the corresponding first and second valve seals to a flow position separated from the corresponding first and second valve seals to permit flow therebetween, thereby defining a flow path between the outboard terminal connections. In the coupled condition, the first non-wetted surfaces are sealed off from the flow path by sealing engagement with a flow passage defining annular wall of the second connector, and the second non-wetted surfaces are sealed off from the flow path by sealing engagement with a flow passage defining annular wall of the first connector.

BRIEF DESCRIPTION OF THE DRAWINGS

Further advantages and benefits will become apparent to those skilled in the art after considering the following description and appended claims in conjunction with the accompanying drawings, in which:

DESCRIPTION OF THE EXEMPLARY EMBODIMENTS

Figure 1A:
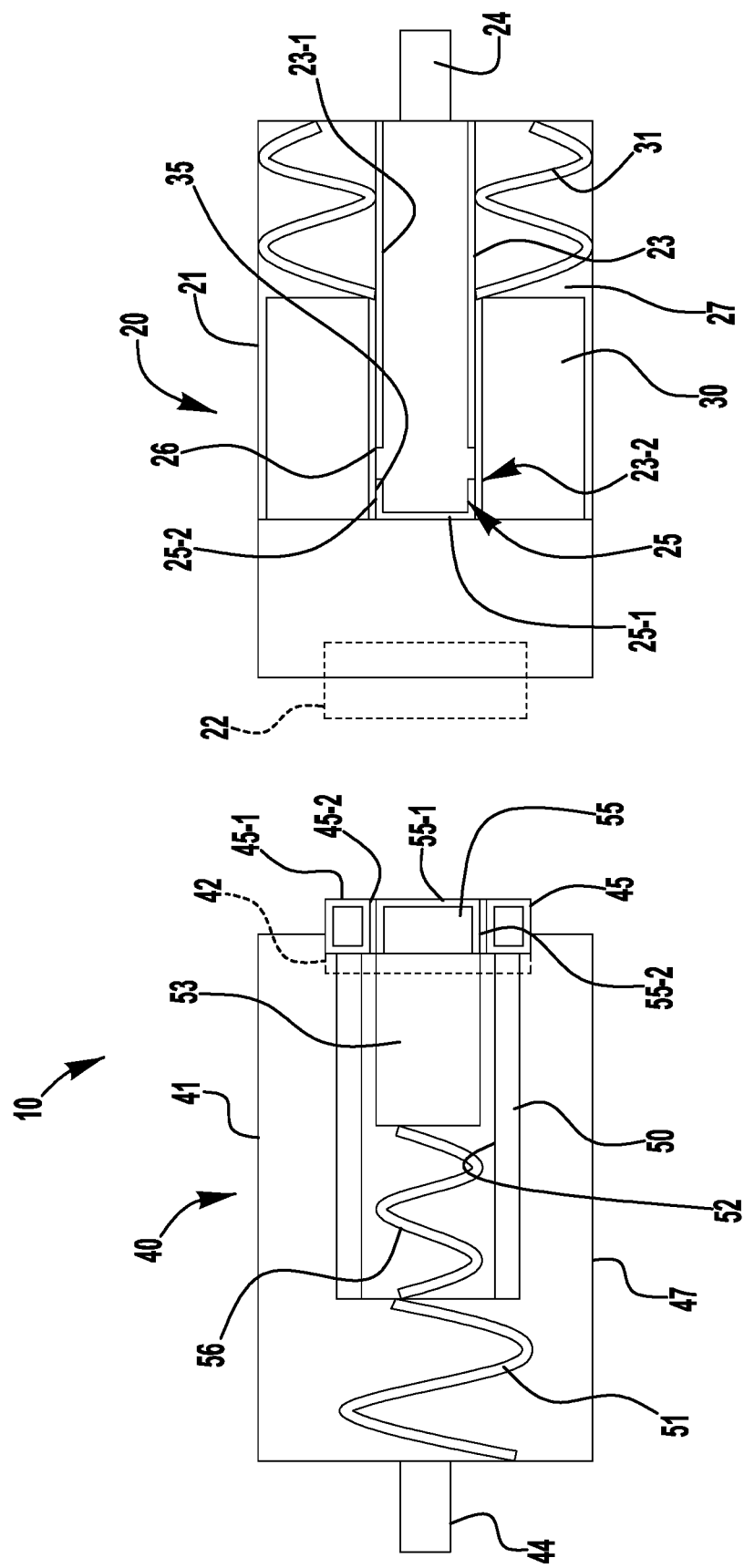
FIG. 1A is a schematic cross-sectional illustration of an exemplary aseptic coupling system, according to an exemplary embodiment of the present disclosure, shown in an uncoupled condition.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Reference herein to "outboard" and "inboard" are for convenience and simply refer to whether a direction is axially towards the coupling connection (inboard) or away from the coupling connection (outboard), referenced to a central longitudinal axis of the coupling assembly.

This Detailed Description merely describes exemplary embodiments and is not intended to limit the scope of the claims in any way. Indeed, the invention as claimed is broader than and unlimited by the described embodiments, and the terms used in the claims have their full ordinary meaning. For example, . . . .

Fluid coupling systems often require sealing arrangements in its connectors (e.g., mating plug-type and socket-type connectors) that prevent leakage or spillage of system fluid when the connectors are uncoupled. Such spill-proof connectors include internal valve elements that are movable between an open, flow permitting position when the connectors are coupled, and a closed, flow preventing position when the connectors are uncoupled. Conventional spill-proof connectors include wetted sealing surfaces that are exposed to the external environment when the connectors are uncoupled, thereby exposing these wetted sealing surfaces to potential contamination. In aseptic fluid system, the potential for introduction of this potential contamination into the flow path is often undesirable or unacceptable. While some aseptic coupling systems utilize a removable or displaceable sterile seal to maintain sterile conditions of the uncoupled connectors, such arrangements require additional steps and user training to affect a connection.

According to an exemplary aspect of the present disclosure, an aseptic coupling system may be provided with first and second connectors having axially movable (i.e., in the direction of the central axis of the connectors) valve seal elements with wetted surfaces and non-wetted surfaces. In the uncoupled condition of the first and second connectors, the valve seal elements are positioned such that the wetted surfaces are sealed off from exposure to the external environment by portions the non-wetted surfaces. In the coupled condition of the first and second connectors, the valve seal elements are positioned such that potentially contaminated portions of the non-wetted surfaces are sealed off from the fluid flow path of the coupling system.

Figure 1B:
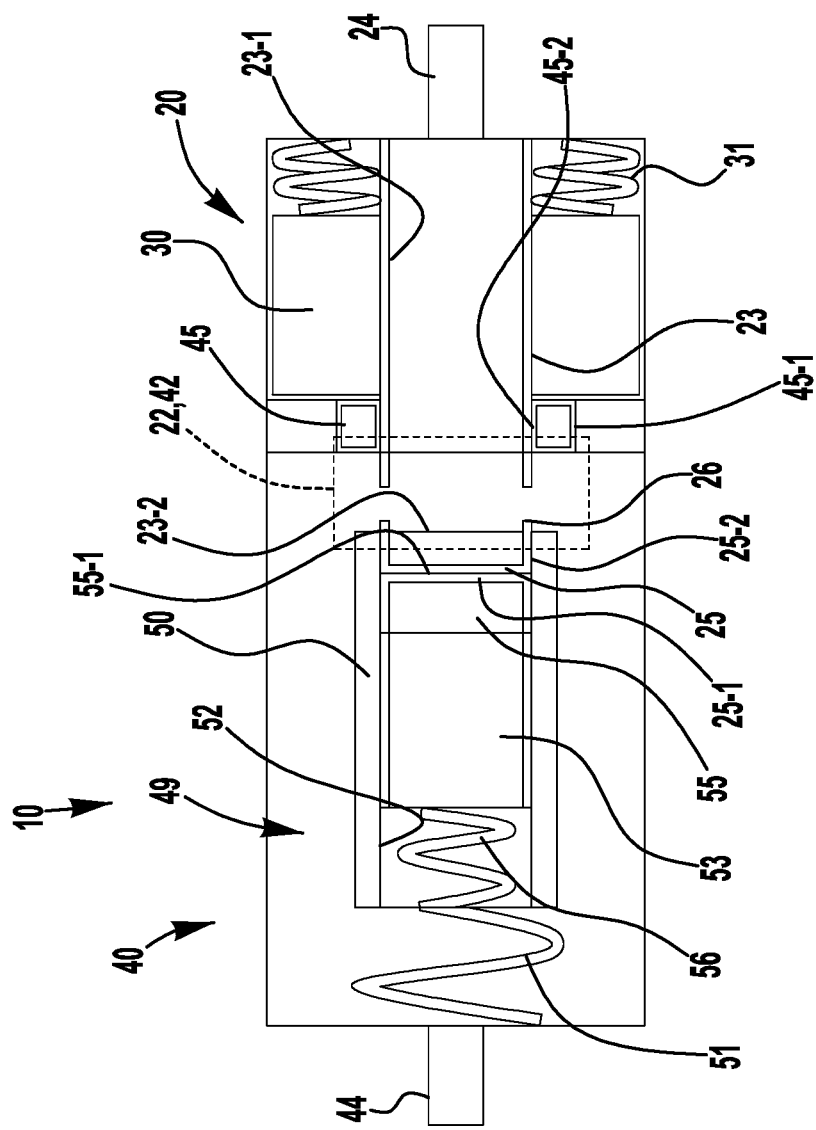
FIG. 1B is a schematic cross-sectional illustration of the aseptic coupling system of FIG. 1A, shown in a coupled condition.
Figure 2:
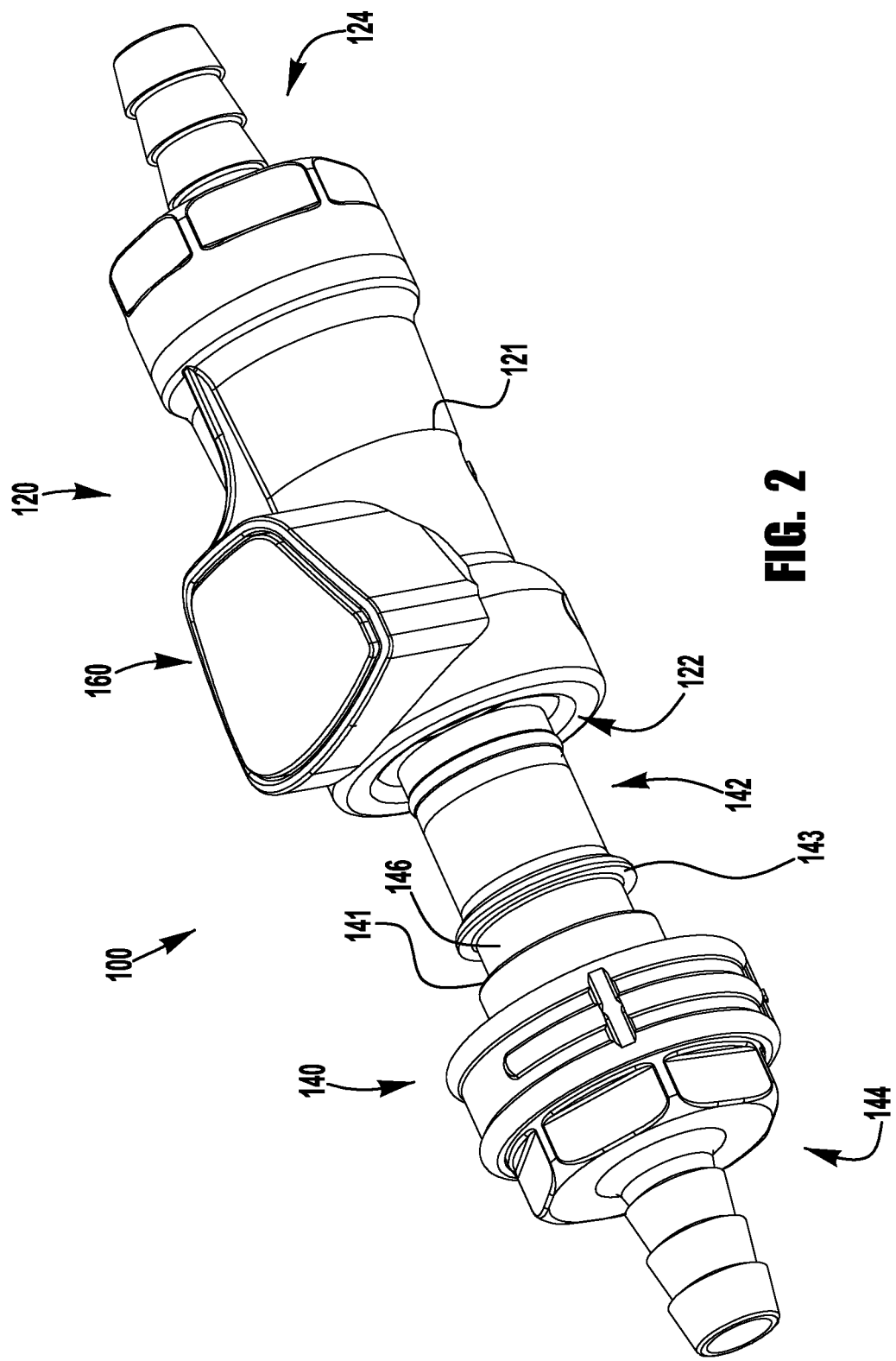
FIG. 2 is a perspective view of an exemplary aseptic coupling system according to an exemplary embodiment of the present disclosure, shown in an uncoupled condition.

FIGS. 1A and 1B schematically illustrate a coupling system 10 including first and second connectors 20, 40 configured for aseptic coupling engagement when an inboard mating portion 22 (e.g., socket) of the first connector is engaged with an inboard mating portion 42 (e.g., plug) of the second connector. The first and second connectors each include outboard terminal connections 24, 44 opposite the mating portions 22, 42, for connecting the first and second connectors with suitable fluid system components (e.g., hose). In some embodiments, mating engagement of the inboard mating portions may be substantially permanent, using, for example, a lock or snap engagement, while in other embodiments, mating engagement of the inboard mating portions may be temporary or releasable, using, for example, a latch engagement (e.g., a button-type latch).

The exemplary first connector 20 includes a body 21 defining the mating portion 22, with the outboard terminal connection 24 fixed to (e.g., assembled with or integral with) the body 21, and a flow element 23 fixed to (e.g., assembled with or integral with) the body 21 and disposed in an internal cavity 27 of the body between the mating portion 22 and the terminal connection 24. The flow element 23 defines a flow passage 23-1 in fluid communication with the terminal connection 24 and includes an inboard end 23-2 defining a first valve seal 25 and at least one peripheral flow aperture 26 intersecting the central flow passage 23-1 outboard of the first valve seal. A first valve element 30 is disposed in an outer portion of the cavity 27 between the flow element 23 and an inner surface of the body 21, and is axially biased (e.g., by spring portion 31) into sealing engagement with the first valve seal 25, with the first valve seal blocking or sealing flow from the terminal connection 24 to the mating portion 22 when the first connector 20 is disconnected or uncoupled from the second connector 40. In this uncoupled condition (FIG. 1A), portions of non-wetted surfaces 25-1 of the first valve seal 25 are exposed to the environment (and potential contamination), while wetted surfaces 25-2 of the first valve seal are sealed off from exposure to the external environment by sealing engagement between non-exposed portions of the non-wetted surfaces 25-1 of the first valve seal and the inner diameter 35 of the first valve element 30.

The exemplary second connector 40 includes a body 41 defining the mating portion 42, with the outboard terminal connection 44 fixed to (e.g., assembled with or integral with) the body 41, an annular second valve seal 45 disposed at (e.g., fixed to or biased against) an inboard end of the mating portion 42, and a second valve element 50 disposed in an internal cavity 47 of the body 41 and biased (e.g., by spring portion 51) from a flow position axially spaced from the second valve seal 45 to a shutoff position in sealing engagement with the second valve seal. The second valve element 50 defines a central passage 52 in which a plunger element 53 is disposed. The plunger element 53 includes an inboard plunger seal 55 and is axially biased (e.g., by spring portion 56) toward the second valve seal 45 for sealing engagement between the plunger seal 55 and the second valve seal 45 when the second connector 40 is disconnected or uncoupled from the first connector 20. In this uncoupled condition, portions of non-wetted surfaces 45-1, 55-1 of the second valve seal 45 and plunger seal 55 are exposed to the environment (and potential contamination), while wetted surfaces 45-2, 55-2 of the second valve seal and plunger seal are sealed off from exposure to the external environment by sealing engagement of the second valve seal non-wetted surfaces 45-1 with the plunger seal non-wetted surfaces 55-1. The plunger element 53 and/or the second valve element 50 may be provided with a stop feature (not shown) to limit inboard biased movement of the plunger element, for example, to prevent the plunger element from disengaging from the central passage 52.

The seals described herein may include any of a variety of suitable materials, including elastomers, such as, for example, silicone, ethylene propylene diene monomer (EPDM), and fluoroelastomers (e.g., Viton™) and plastics (e.g., thermoplastics, such as polypropylene). The seals may be provided as over-molded elastomeric/plastic portions, O-ring/gasket seals, or plastic-on-plastic interfering geometries.

When the first and second connectors 20, 40 are coupled (FIG. 1B), with the first and second mating portions 22, 42 in mating engagement, the plunger seal 55 engages the first valve seal 25 and the second valve seal 45 engages the inboard end of the first valve element 30. The axially fixed flow element 23 forces the plunger element 53 and the first valve seal 25 into the second valve element central passage 52 (against biasing spring portion 56), and causes the second mating portion 42 to force the first valve element 30 in an outboard direction (against biasing spring portion 31), such that the inner diameter of the second valve seal 45 seals against the flow element 23. The second valve element 50 remains axially biased inboard by spring element 51, sealing against element 45 while the sealing element 55 moves outboard. Only once both the plunger element 53 and the valve seal 25 are fully encapsulated in the central passage 52, does the flow element 23 force the second valve element 50 in an outboard direction (against biasing spring portion 51), such that the second valve element axially separates from the second valve seal 45, to position the at least one peripheral flow aperture 26 axially between the second valve seal 45 and the inboard end of the second valve element 50. This fully installed condition provides a flow path between the terminal connections 24, 44, through the flow passage 23-1, the peripheral flow aperture 26, and an annular space 49 between the second valve element 50 and the inner surface of the second connector body 41.

In this coupled condition of the first and second connectors 20, 40, non-wetted surfaces 25-1, 55-1 of the first valve seal 25 and plunger seal 55 are captured in the second valve element central passage 52 and sealed off from the flow path by sealing engagement between wetted outer peripheral surfaces 25-2 of the first valve seal 25 and the inner surface of the second valve element 50. Non-wetted surfaces 45-1 of the second valve seal 45 are sealed off from the flow path by sealing engagement between wetted inner peripheral surfaces 45-2 of the second valve seal 45 and outer surfaces of the central flow element 23. By this arrangement, the potentially contaminated portions of the non-wetted surfaces 25-1, 45-1, 55-1 of the first valve seal, second valve seal, and plunger seal are sealed off from the fluid flow path.

FIGS. 2-7A illustrate an exemplary embodiment of an aseptic coupling system 100 including a variety of features, any one or more of which may be incorporated into the more broadly described exemplary aseptic coupling system of FIGS. 1A-1B.

The exemplary aseptic coupling system 100 includes a socket connector 120 and a plug connector 140 configured for aseptic coupling engagement when an inboard plug portion 142 of the plug connector is fully inserted into an inboard socket portion 122 of the socket connector. The socket connector 120 and plug connector 140 each include outboard terminal connections 124, 144 opposite the socket and plug portions 122, 142, for connecting the socket connector and plug connector with suitable fluid system components (e.g., hose). While many types and numbers of terminal connections may be provided, in the illustrated example, the illustrated terminal connections 124, 144 include barbed hose fittings for installation with plastic hose ends (not shown).

Figure 3:
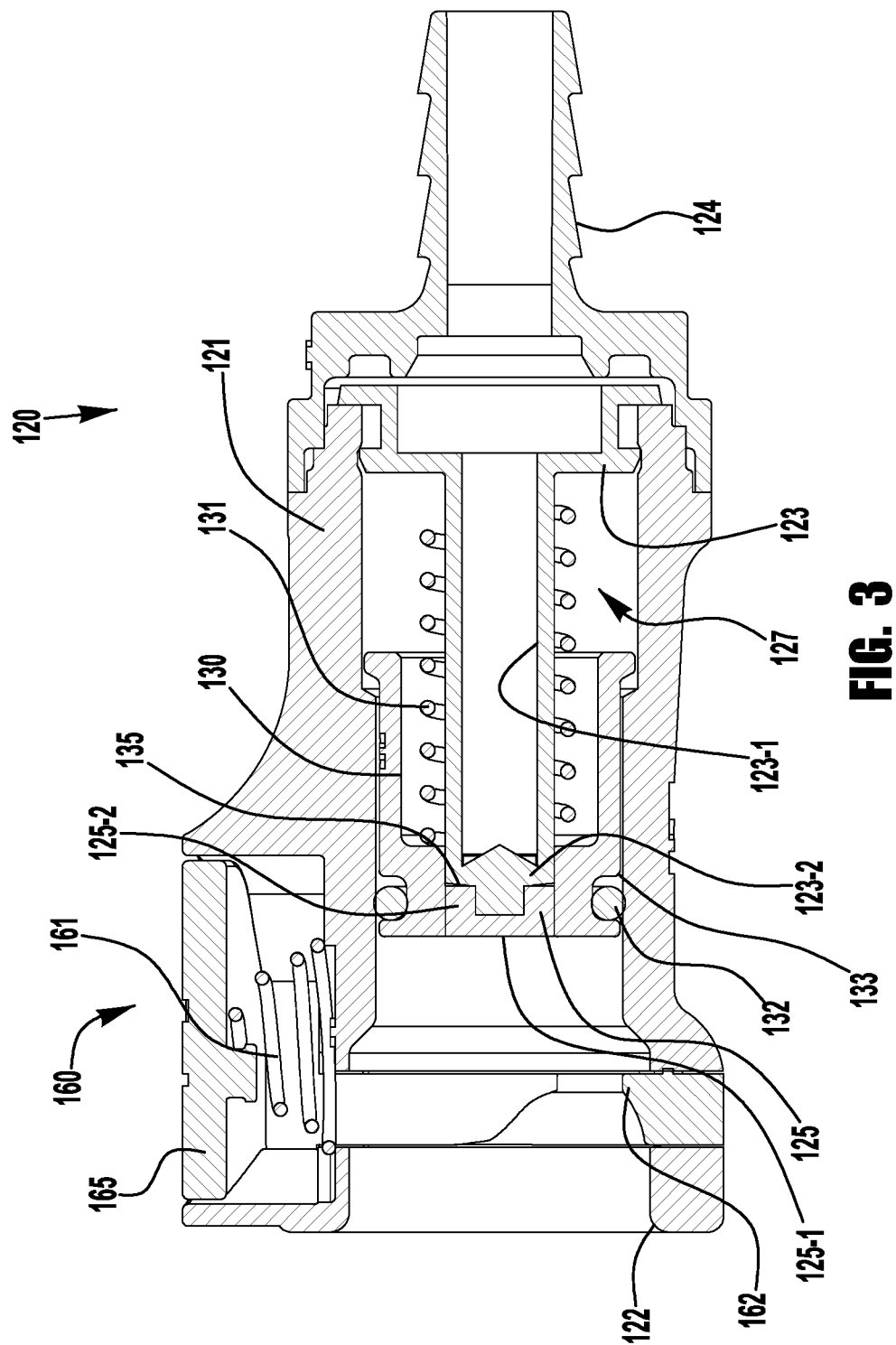
FIG. 3 is a cross-sectional view of the plug connector of the aseptic coupling system of FIG. 2.

As shown in the cross-sectional view of FIG. 3, the exemplary socket connector 120 includes a body 121 defining the socket portion 122, with the outboard terminal connection 124 fixed to (e.g., assembled with or integral with) the body 121, and a central flow element 123 fixed to (e.g., assembled with or integral with) the body 121 and disposed in an internal cavity 127 of the body between the socket portion and the terminal connection 124. While many different integral and assembled arrangements may be used, in the illustrated embodiment, the terminal connection 124 is press fit over an end portion of the socket connector body 121, and the central flow element is provided as an insert with an outboard end portion captured between the connector body and the terminal connection.

The central flow element 123 defines a central flow passage 123-1 in fluid communication with the terminal connection 124 and includes an inboard end 123-2 defining a socket valve seal 125 (e.g., over-molded or press-fit plastic or elastomeric tip) and at least one peripheral flow aperture 126 intersecting the central flow passage 123-1 outboard of the socket valve seal. An annular socket valve element 130 is disposed in an outer portion of the cavity 127 between the central flow element 123 and an inner surface of the socket connector body 121, and is axially biased (e.g., by spring 131) into sealing engagement with the socket valve seal 125, to seal against flow from the terminal connection 124 to the socket portion 122 when the socket connector 120 is disconnected from the plug connector 140. In this uncoupled condition, portions of non-wetted surfaces 125-1 of the socket valve seal 125 are exposed to the environment (and potential contamination), while wetted surfaces 125-2 of the socket valve seal are sealed off from exposure to the external environment by sealing engagement between non-exposed portions of the non-wetted surfaces 125-1 of the socket valve seal and the inner diameter 135 of the socket valve element 130. As shown, the non-wetted surfaces 125-1 of the socket valve seal 125 may be limited to a lipped end surface of the socket valve seal, for example, to impede migration of contaminants from the non-wetted surfaces to the wetted surfaces 125-2 (i.e., cylindrical side surfaces) of the socket valve seal.

As shown, an O-ring or gasket seal 132 may be provided between the socket valve element 130 and the socket connector body 121 (e.g., in an annular groove 133 in the socket valve element) to provide a fluid tight seal between the socket valve element and the socket connector body.

Figure 4:
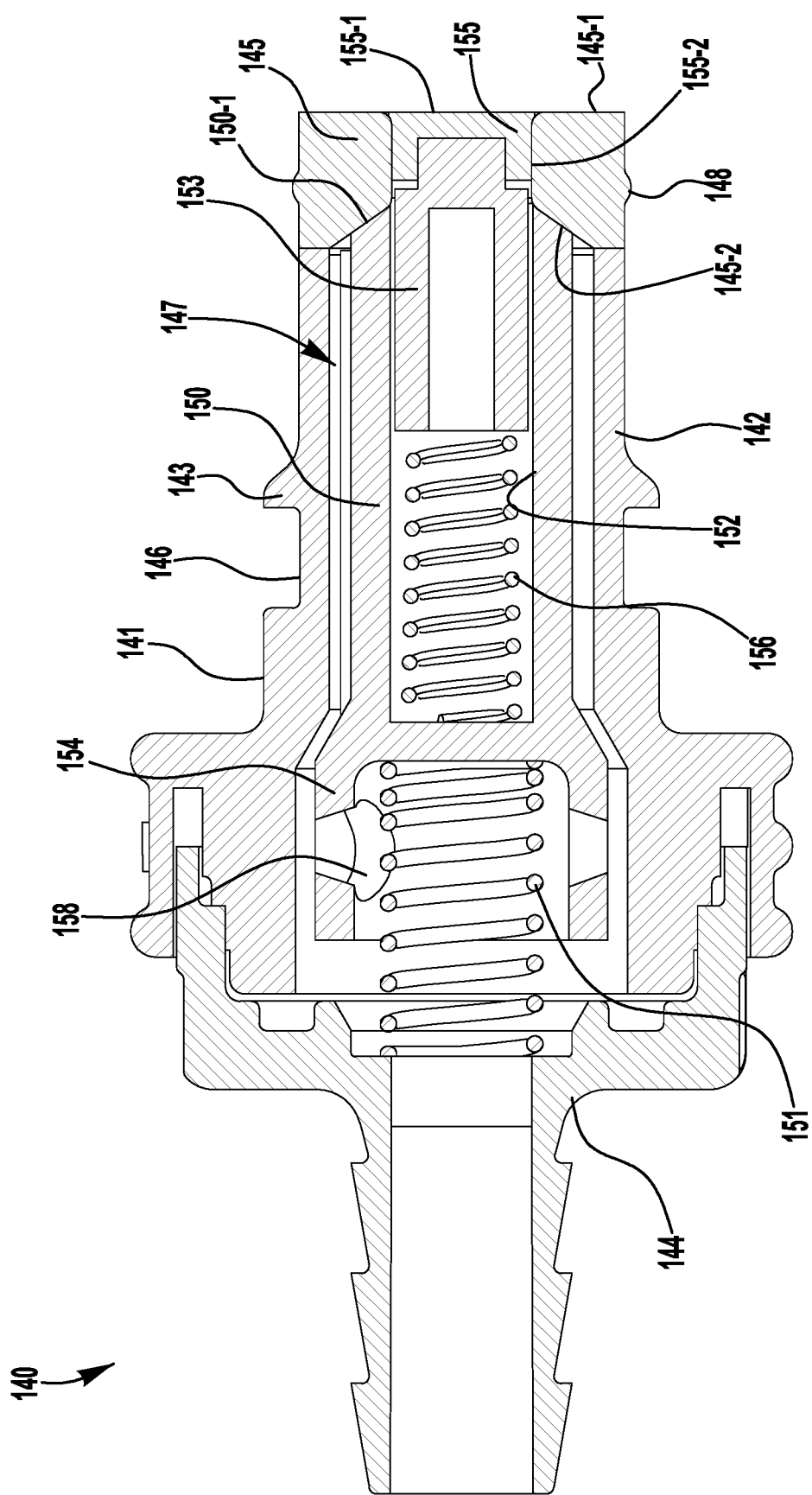
FIG. 4 is a cross-sectional view of the socket connector of the aseptic coupling system of FIG. 2.

As shown in the cross-sectional view of FIG. 4, the exemplary plug connector 140 includes a body 141 defining the plug portion 142, with the outboard terminal connection 144 fixed to (e.g., assembled with or integral with) the body 141, and an annular plug valve seal 145 disposed at (e.g., over-molded onto or otherwise fixed to, or axially biased against) an inboard end of the plug portion 142. While many different integral and assembled arrangements may be used, in the illustrated embodiment, a collar portion of the terminal connection 124 is press fit over into an annular recess in the connector body 141.

A plug valve element 150 is disposed in an internal cavity 147 of the plug connector body 141 and is biased (e.g., by spring 151) from a flow position axially spaced from the plug valve seal 145 to a shutoff position in sealing engagement with the plug valve seal. In the illustrated embodiment, the plug valve element biasing spring 151 is seated in an outboard base portion 154 of the plug valve element 150, which may include one or more apertures 158 to facilitate fluid flow.

The plug valve element 150 defines a central passage 152 in which a plunger element 153 is disposed. The plunger element 153 includes an inboard plunger seal 155 (e.g., over-molded or press-fit plastic or elastomeric tip) and is axially biased (e.g., by spring 156) toward the plug valve seal 145 for sealing engagement between the plunger seal 155 and the plug valve seal 145 when the plug connector 140 is disconnected or uncoupled from the socket connector 120. In this uncoupled condition, portions of non-wetted surfaces 145-1, 155-1 of the plug valve seal 145 and plunger seal 155 are exposed to the environment (and potential contamination), while wetted surfaces 145-2, 155-2 of the plug valve seal and plunger seal are sealed off from exposure to the external environment by sealing engagement of non-exposed portions of the plug valve seal non-wetted surfaces 145-1 with the plunger seal non-wetted surfaces 155-1. The plunger element 153 and/or the plug valve element 150 may be provided with a stop feature (not shown) to limit inboard biased movement of the plunger element, for example, to prevent the plunger element from disengaging from the central passage 152.

The exemplary plug valve seal 145 includes an annular sealing rib 148 sized and positioned to seal against the socket connector socket portion 122 when the plug portion 142 is installed in the socket portion.

Figure 5:
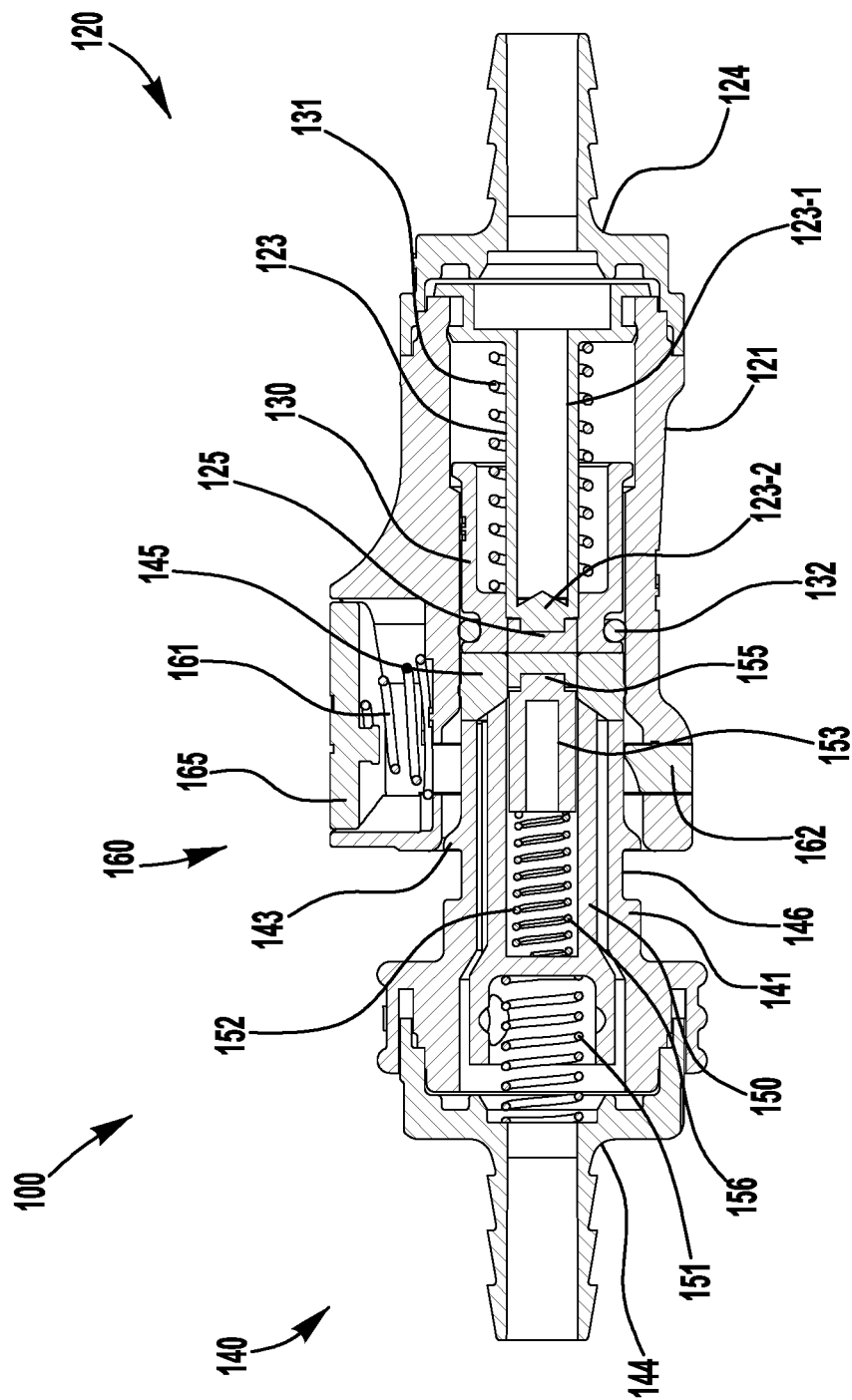
FIG. 5 is a cross-sectional view of the aseptic coupling system of FIG. 2, shown with the plug connector in a first partially installed position.
Figure 5A:
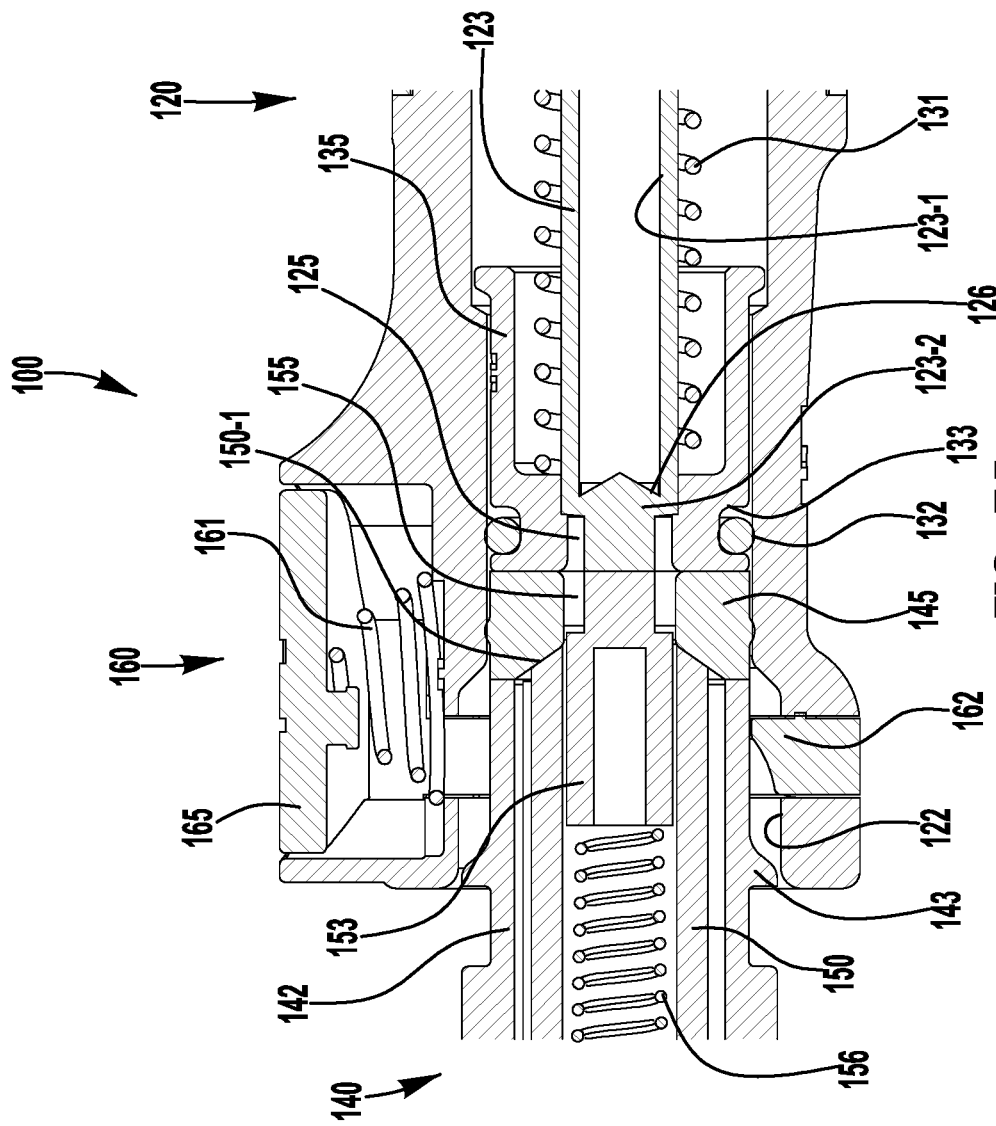
FIG. 5A is an enlarged cross-sectional partial view of the sealing arrangement of the aseptic coupling system of FIG. 5.
Figure 6:
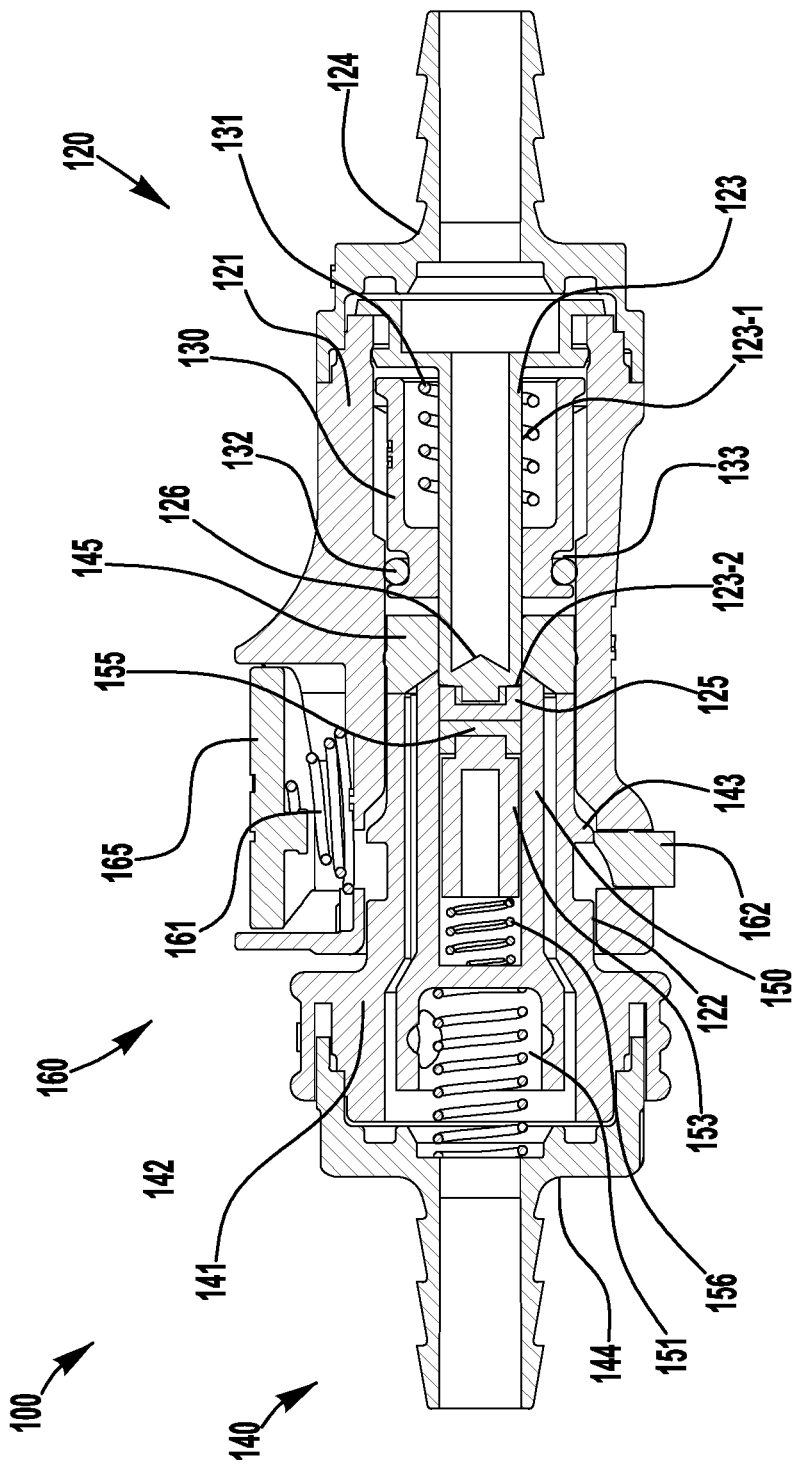
FIG. 6 is a cross-sectional view of the aseptic coupling system of FIG. 2, shown with the plug connector in a second partially installed position.
Figure 6A:
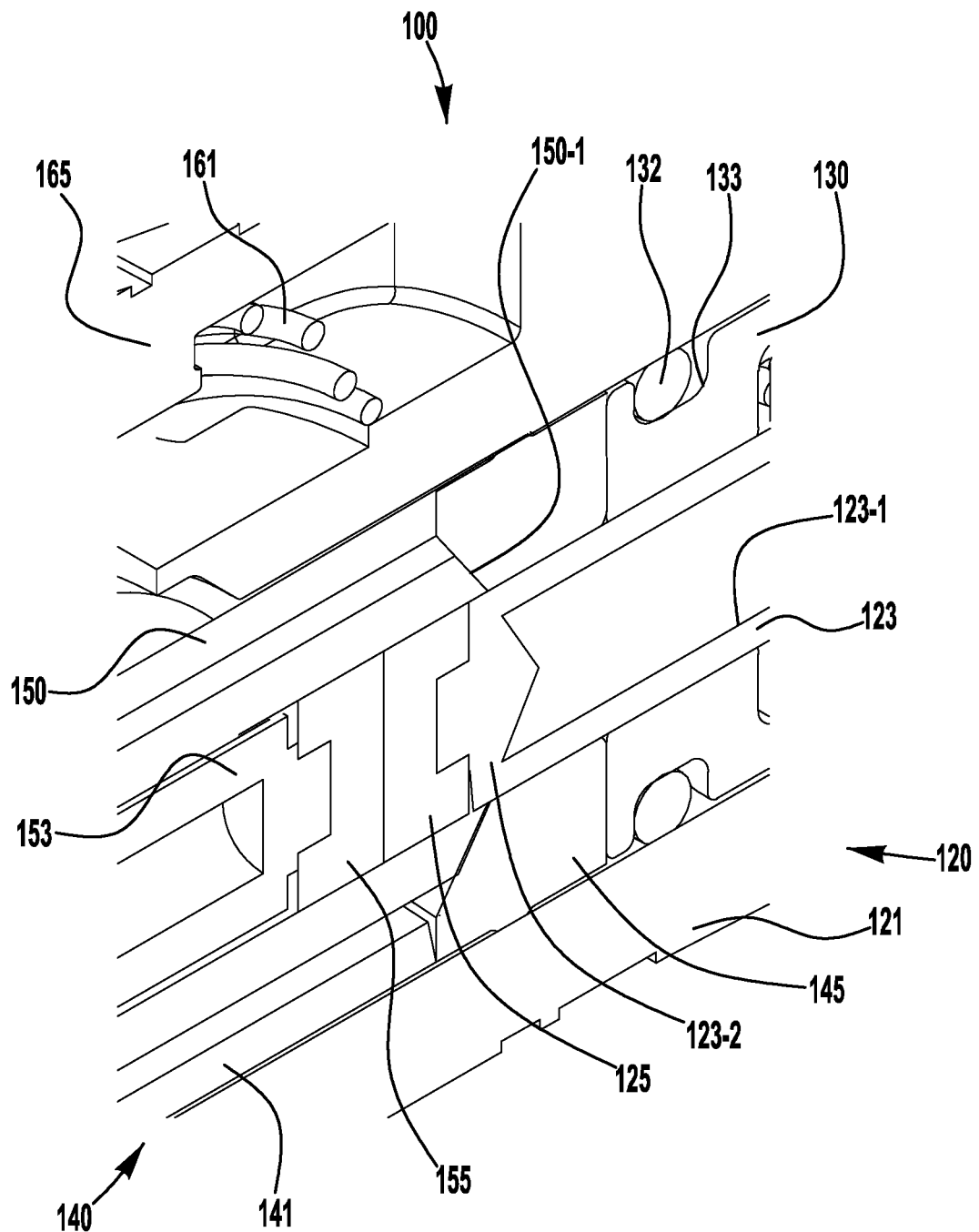
FIG. 6A is an enlarged cross-sectional partial perspective view of the sealing arrangement of the aseptic coupling system of FIG. 6.
Figure 7:
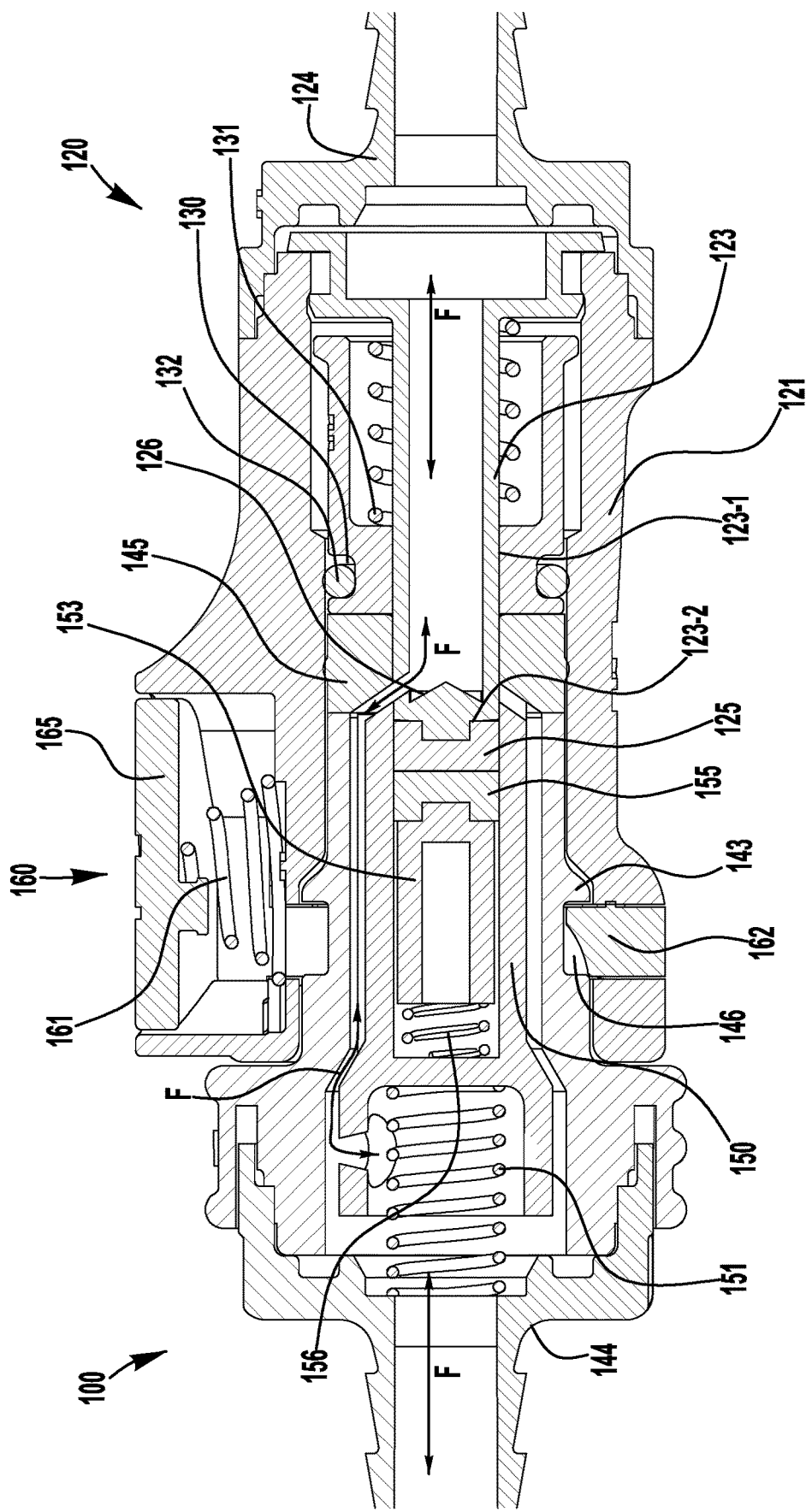
FIG. 7 is a cross-sectional view of the aseptic coupling system of FIG. 2, shown with the plug connector in a fully installed and latched position.
Figure 7A:
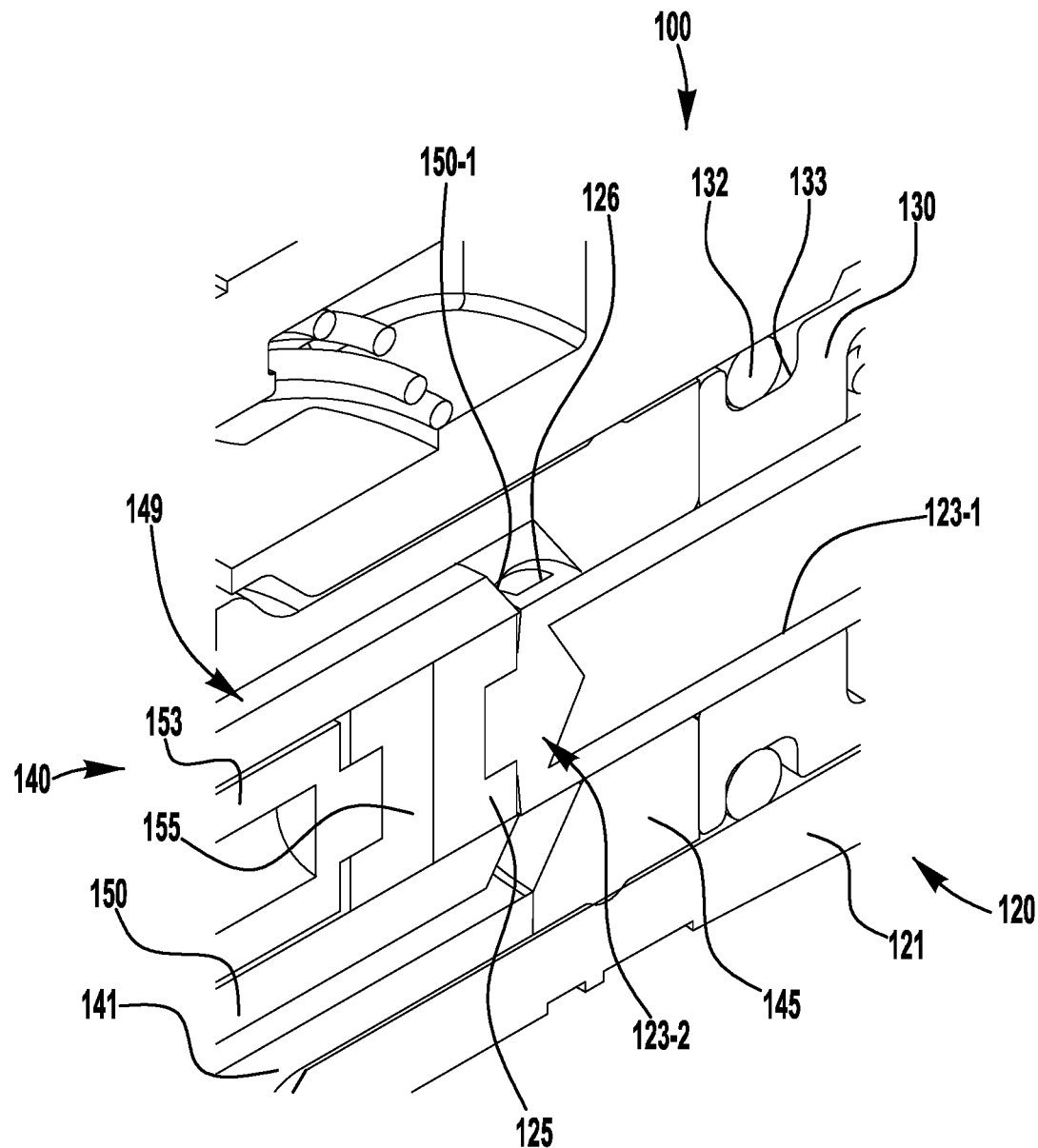
FIG. 7A is an enlarged cross-sectional partial perspective view of the sealing arrangement of the aseptic coupling system of FIG. 7.

During coupling of the plug connector 140 with the socket connector 120, the plug portion 142 is inserted into the socket portion 122 such that the plunger seal 155 engages the socket valve seal 125 and the plug valve seal 145 engages the inboard end of the socket valve element 130 (FIGS. 5 and 5A). Further advancement of the plug portion 142 into the socket portion 122 causes the axially fixed central flow element 123 to force the plunger seal 155 and the socket valve seal 125 into the plug valve element central passage 152 (against biasing spring 156), and causes the plug portion 142 to force the socket valve element 130 in an outboard direction (against biasing spring 131), such that the inner diameter of the plug valve seal 145 seals against the central flow element 123 (FIGS. 6 and 6A).

While the plunger seal 155 and socket valve seal 125 are not yet fully received and sealingly encapsulated in the plug valve element central passage 152, the plug valve seal 145 remains in sealing engagement with the inboard end face 150-1 of the plug valve element 150, such that the potentially contaminated portions of the non-wetted surfaces 155-1, 125-1 of the plunger seal 155 and socket valve seal 125 are not exposed to the system fluid. Once both the plunger seal 155 and the valve seal 125 are sealingly encapsulated in the central passage 152, when the plug portion 142 is fully inserted in the socket portion 122 (FIGS. 7 and 7A), the axially fixed central flow element 123 forces the plug valve element 150 in an outboard direction (against biasing spring 151), such that the end face 150-1 of the plug valve element 150 axially separates from the plug valve seal 145, to position the at least one peripheral flow aperture 126 axially between the plug valve seal and the inboard end face 150-1 of the plug valve element. This fully installed condition provides a flow path between the terminal connections 124, 144, through the central flow passage 123-1, the peripheral flow aperture 126, the annular space 149 between the plug valve element 150 and the inner surface of the plug connector body 141, and the plug valve element base apertures 158, as shown by arrows F in FIG. 7.

In an exemplary embodiment, the socket valve element biasing spring 131, plug valve element biasing spring 151, and plunger element biasing spring 156 may be provided with relative spring strengths selected to ensure that the plug valve seal 145 does not prematurely disengage from the plug valve element 150 during coupling (i.e., before the plunger seal 155 and socket valve seal 125 are sealingly encapsulated in the plug valve element central passage 152). In other embodiments, other features and arrangement may additionally or alternatively be used to prevent premature disengagement of the plug valve seal from the plug valve element during coupling. For example, the plug valve element may include a retaining arrangement (not shown) configured to snap, latch, connect, or interfere (e.g. ball detent) with the plug connector body to control the timing of when the plug valve element disengages from the plug valve seal.

In the exemplary embodiment of FIGS. 2-7A, the socket connector 120 includes a socket valve element biasing spring 131 that is substantially isolated from fluid flow by retaining the spring around the central flow element 123. In some applications, this arrangement is desirable for avoiding or minimizing exposure of the biasing spring to the system fluid, for example, to avoid contamination of the system fluid by spring particle generation and/or corrosion or deterioration of the spring. While the plug connector 140 of the system 100 of FIGS. 2-7A includes a plug valve element biasing spring 151 that is retained in the flow path, in other embodiments, the plug connector may be configured to isolate the plug valve element biasing spring from the plug connector flow path.

Figure 8:
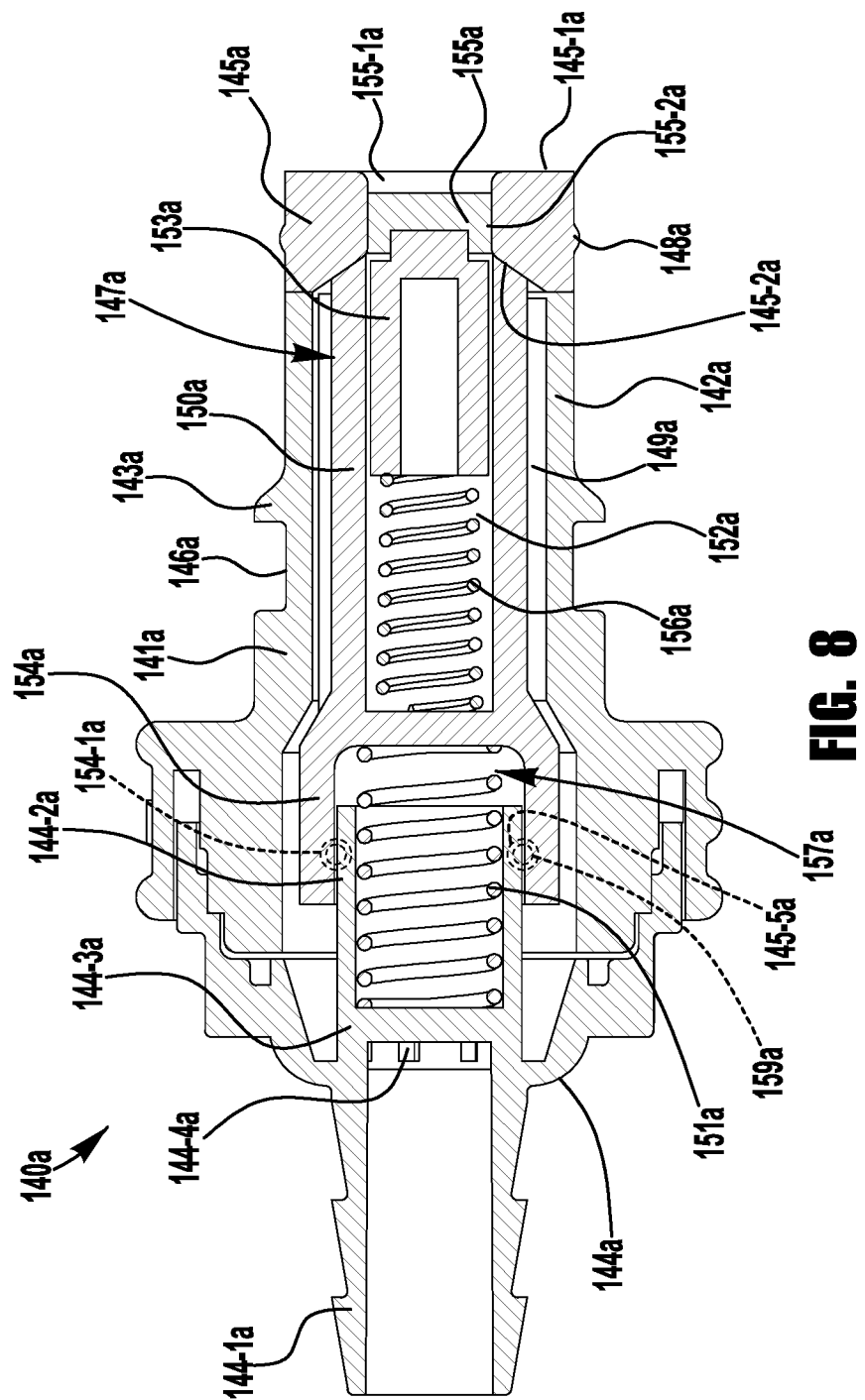
FIG. 8 is a cross-sectional view of another socket connector for use in an aseptic coupling system, in accordance with another exemplary embodiment of the present disclosure.

FIG. 8 illustrates an exemplary embodiment of a plug connector 140a, similar in structure and function to the plug connector 140 of FIGS. 2-7A (and using like reference numbers), but provided with an isolated spring arrangement. The exemplary plug connector 140a includes a body 141a defining a plug portion 142a, an outboard terminal connection 144a assembled with the body, an annular plug valve seal 145a fixed to an inboard end of the plug portion 142a, and a plug valve element 150a disposed in an internal cavity 147a of the plug connector body 141a. The terminal connection 144a includes a spring supporting collar 144-2a closely received in an annular base portion 154a of the plug valve element 150a to define a spring chamber 157a that retains a biasing spring 151a compressed between the terminal connection and the plug valve element to bias the plug valve element toward the shutoff position. An annular base wall 144-3a of the terminal connection includes one or more apertures 144-4a for fluid communication between the plug connector body annular space 149a and the terminal connection end port 144-1a, thereby bypassing the spring chamber 157a. To further isolate the biasing spring 151a from the system fluid, an O-ring seal 159a may be provided between the spring supporting collar 144-2a and the annular base portion 154a, for example, in a groove formed in either of the spring supporting collar (at 144-5a) and the annular base portion (at 154-1a).

While the socket valve element 130, biasing spring 131, and gasket seal 132 of the socket connector 120 of FIGS. 2-7A are shown as separate components, in another embodiment (not shown), a socket valve element may be integrally formed with a biasing spring portion, such as an elastically compressible or compliant (e.g., accordion-like or otherwise flexing) extension, and/or an outer sealing rib in place of the separate seated gasket. The integrated socket valve element component may be provided in suitable materials (e.g., elastomers, such as silicone, or thermoplastics, such as polypropylene) for desirable elastic and/or seal forming properties, or to eliminate metal components (e.g., metal compression springs) from the assembly. The first connector 20 of the schematically shown embodiment of FIGS. 1A-1B may be provided with similar corresponding features.

While the plug valve element 150 and spring 151 of the plug connector 140 of the embodiments of FIGS. 2-7A and 8 are shown as separate components, in another embodiment (not shown), a plug valve element may be integrally formed with a biasing spring portion, such as an elastically compressible or compliant (e.g., accordion-like or otherwise flexing) extension. The integrated plug valve element component may be provided in suitable materials (e.g., elastomers, such as silicone, or thermoplastics, such as polypropylene) for desirable elastic and/or seal forming properties. The second connector 140 of the embodiment of FIGS. 1A-1B may be provided with similar corresponding features.

While the plunger element 153, plunger seal 155, and spring 156 of the plug connector 140 of the embodiments of FIGS. 2-7A and 8 are shown as separate components, in another embodiment (not shown), a plunger element may be integrally formed with a biasing spring portion, such as an elastically compressible or compliant (e.g., accordion-like or otherwise flexing) extension, and/or an inboard sealing head portion in place of the separate sealing cap/over-mold. The integrated plunger element component may be provided in suitable materials (e.g., elastomers, such as silicone, or thermoplastics, such as polypropylene) for desirable elastic and/or seal forming properties, or to eliminate metal components (e.g., metal compression springs) from the assembly. The second connector 140 of the embodiment of FIGS. 1A-1B may be provided with similar corresponding features.

In accordance with other aspects of the present disclosure, still other features may additionally or alternatively be provided with the exemplary aseptic coupling systems described herein. For example, the first connector may include a peripheral flow path (e.g., radially outward of the annular wall of the flow element) instead of the illustrated central flow path. Additionally or alternatively, the second connector may include a central flow path instead of the illustrated peripheral flow path.

As another example, first and second connectors 20, 40 may be provided with a latching arrangement (shown schematically at 60 in FIG. 1B) to hold the connectors in the coupled condition, and to permit selective decoupling of the connectors. While many different latching arrangements may be utilized, in the exemplary system 100 of FIGS. 2-7A, the socket connector 120 is provided with a user depressible latch member 160 assembled with the socket connector body 121. The latch member 160 is biased (by spring 161) towards a latching position in which a latch element 162 extends into the socket portion 122 of the socket connector 120. When the plug portion 142 is inserted into the socket portion 122, a camming flange 143 on the plug portion 142 moves the latch element 162 outward against the spring biasing forces, allowing full insertion of the plug portion and spring biased engagement of the latch element 162 with an annular recess 146 in the plug portion 142 for latching engagement with the socket portion. To uncouple the connectors, 120, 140, a button portion 165 of the latch member is pressed against biasing spring 161 to withdraw the latch element 162 from the annular recess 146 for withdrawal of the plug portion 142.

As another example, the coupling system may be provided with one or more sensors (e.g., at or near the fluid path) configured to measure and transmit (e.g., by wireless Bluetooth® or WiFi communication), fluid flow data, including, for example, flow rate, temperature, and/or pressure.

As another example, surfaces of the connector components (e.g., wetted surfaces) may include (e.g., formed with or coated with) antimicrobial chemicals/compounds or other such materials selected for compatibility with an intended system fluid.

While any suitable materials may be used, in exemplary embodiments, the connector bodies 21, 41, 121, the terminal connections 24, 44, 124, 144, and the valve and plunger elements 30, 50, 53, 130, 150, 153 may include, for example, any one or more of polypropylene, nylon, polyethylene, acetal, polycarbonate, polysulfone, acrylic, PBT, ABS, and copolyester. O-ring/gasket seals 132 and valve and plunger seals 125, 145, 155 may include, for example, any one or more of silicone, ethylene propylene diene monomer (EPDM), fluoroelastomers (e.g., Viton™), Buna-N, Natural Rubber, Polyisoprene, FFKM, FKM, FVMQ (fluorosilicone), Nitrile, thermoplastic polyurethane (TPU), thermoplastic vulcanisates (TPV), and thermoplastic elastomers (TPE). Materials may be loaded or modified with colorants, fibers, or chemical agents (e.g. antibacterial/antimicrobial).

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. An aseptic coupling system comprising:
    a first connector comprising:
        a first body including an inboard mating portion, an outboard terminal connection, and a flow element disposed in an internal cavity of the first body, the flow element defining a first flow passage, a first valve seal disposed at an inboard end of the flow element, and at least one flow aperture intersecting the first flow passage outboard of the first valve seal; and
        a first valve element disposed in the internal cavity between the flow element and an inner surface of the first body, the first valve element being movable between a shutoff position in sealing engagement with the first valve seal and a flow position permitting flow between the inboard mating portion and the first flow passage; and
    a second connector comprising:
        a second body including an inboard mating portion for mating engagement with the inboard mating portion of the first connector, an outboard terminal connection and a second valve seal disposed at an inboard end of the mating portion;
        a second valve element disposed in an internal cavity of the second body and movable between a shutoff position in sealing engagement with the second valve seal and a flow position permitting flow between the inboard mating portion and a second flow passage within the second connector; and
        a plunger element disposed in a passage of the second valve element, the plunger element including an inboard plunger seal and being axially biased toward the second valve seal for sealing engagement between the plunger seal and the second valve seal.

2. The aseptic coupling system of claim 1, wherein when the first and second connectors are in an uncoupled condition, portions of non-wetted surfaces of the first valve seal are exposed to an external environment, and wetted surfaces of the first valve seal are sealed off from exposure to the external environment by sealing engagement between the non-wetted surfaces of the first valve seal and an inner diameter of the first valve element.

3. The aseptic coupling system of claim 1, wherein when the first and second connectors are in an uncoupled condition, portions of non-wetted surfaces of the second valve seal and plunger seal are exposed to an external environment, and wetted surfaces of the second valve seal and plunger seal are sealed off from exposure to the external environment by sealing engagement of the second valve seal non-wetted surfaces with the plunger seal non-wetted surfaces.

4. The aseptic coupling system of claim 1, wherein when the first and second connectors are joined in a coupled condition, non-wetted surfaces of the first valve seal and plunger seal are captured in the second valve element passage and sealed off from the flow path by sealing engagement between wetted outer peripheral surfaces of the first valve seal and the inner surface of the second valve element.

5. The aseptic coupling system of claim 1, wherein when the first and second connectors are joined in a coupled condition, non-wetted surfaces of the second valve seal are sealed off from the flow path by sealing engagement between wetted inner peripheral surfaces of the second valve seal and outer surfaces of the flow element.

6. The aseptic coupling system of claim 1, wherein when the first and second connectors are joined in a coupled condition, non-wetted surfaces of the second valve seal are sealingly encapsulated in the passage of the second valve element.

7. The aseptic coupling system of claim 1, wherein the second valve element is configured to remain in the shutoff position until the non-wetted surfaces of the second valve seal are sealingly encapsulated in the passage of the second valve element.

8. The aseptic coupling system of claim 1, wherein when the first and second connectors are joined in a coupled condition:
    the plunger seal engages the first valve seal and the second valve seal engages an inboard end of the first valve element;
    the flow element forces the plunger element and the first valve seal into the second valve element passage;
    the second mating portion forces the first valve element in an outboard direction such that an inner diameter of the second valve seal seals against the flow element; and
    the flow element forces the second valve element in an outboard direction such that the second valve element axially separates from the second valve seal to position the at least one peripheral flow aperture axially between the second valve seal and the inboard end of the second valve element.

9. The aseptic coupling system of claim 1, wherein the inboard mating portion of the first connector comprises a socket portion, and the inboard mating portion of the second connector comprises a plug portion.

10. The aseptic coupling system of claim 9, wherein the first connector comprises a latch member extending into the socket portion for latching engagement with the plug portion when the second connector is coupled with the first connector.

11. The aseptic coupling system of claim 1, wherein the second valve element is biased to the shutoff position by a first biasing element and the plunger element is biased toward the second valve seal by a second biasing element.

12. The aseptic coupling system of claim 11, wherein the relative biasing strengths of the first and second biasing elements are selected such that an axial force applied to the plunger element causes the plunger element to fully retract into the valve element passage before the valve element axially disengages from the second valve seal.

13. The aseptic coupling system of claim 1, wherein an end face of the second valve element seals against the second valve seal when the second valve element is in the shutoff position.

14. The aseptic coupling system of claim 1, wherein the second valve seal is affixed to the inboard end of the mating portion of the second connector.

15. The aseptic coupling system of claim 1, wherein the inboard end of the mating portion of the second connector comprises a tubular end portion, the second valve seal being over-molded onto the tubular end portion.

16. An aseptic connector comprising:
 a connector body including an inboard mating portion, an outboard terminal connection and an annular valve seal disposed at an inboard end of the mating portion;
 a valve element disposed in an internal cavity of the connector body and biased from a flow position axially spaced from the annular valve seal to a shutoff position in sealing engagement with the annular valve seal; and
 a plunger element disposed in a passage of the valve element, the plunger element including an inboard plunger seal and being axially biased toward the annular valve seal for sealing engagement between the plunger seal and the annular valve seal;
 wherein the plunger element is axially moveable within the passage of the valve element to disengage from the annular valve seal, to permit fluid flow through the annular valve seal and through an outer peripheral flow passage between the valve element and the connector body when the valve element is in the flow position.

17. The aseptic connector of claim 16, wherein the valve element is biased to the shutoff position by a first biasing element and the plunger element is biased toward the annular valve seal by a second biasing element.

18. The aseptic connector of claim 17, wherein the relative biasing strengths of the first and second biasing elements are selected such that an axial force applied to the plunger element causes the plunger element to fully retract into the valve element passage before the valve element axially disengages from the annular valve seal.

19. The aseptic connector of claim 16, wherein an end face of the valve element seals against the annular valve seal when the valve element is in the shutoff position.

20. An aseptic coupling system comprising:
 a first connector comprising an inboard mating portion, an outboard terminal connection, a first valve seal, and a first valve element; and
 a second connector comprising an inboard mating portion for mating engagement with the inboard mating portion of the first connector, an outboard terminal connection, and a second valve seal;
 wherein when the first and second connectors are in an uncoupled condition, first and second non-wetted surface portions of the corresponding first and second connectors are exposed to an external environment, and first and second wetted surfaces of the corresponding first and second valve seals are sealed off from exposure to the external environment; and
 wherein when the first and second connectors are joined in a coupled condition:
 the first and second valve elements are each moved from a shutoff position in sealing engagement with the corresponding first and second valve seals to a flow position separated from the corresponding first and second valve seals to permit flow therebetween, thereby defining a flow path between the outboard terminal connections; and
 the first non-wetted surfaces are sealed off from the flow path by sealing engagement with a flow passage defining annular wall of the second connector, and the second non-wetted surfaces are sealed off from the flow path by sealing engagement with a flow passage defining annular wall of the first connector.

\* \* \* \* \*